3,175,988
COATING OF GLASS FIBER FABRICS
Harry Berns, Fair Lawn, N.J., assignor to United Merchants and Manufacturers, Inc., New York, N.Y., a corporation of Delaware
No Drawing. Filed Feb. 17, 1961, Ser. No. 89,935
11 Claims. (Cl. 260—29.6)

This invention relates to the surface finishing, including the production of colorless or colored coatings on glass fiber fabrics. More specifically, it relates to a method of applying colorless or colored coatings to both unfinished and finished glass fiber fabrics and to compositions for this purpose.

By unfinished fabrics is meant glass fiber fabrics which have been given the conventional heat cleaning treatment to remove size, such as gelatin, starch or sucrose, from the fibers. By finished fabrics is meant glass fiber fabrics given a conventional treatment with colloidal silica (Syton), or polytetrafluoroethylene resins (Teflon), or with a mixture of these materials.

In the specification, all parts and percentages are given on a weight basis.

Glass fibers are notoriously difficult to color in dark shades employing commercially available dyes and pigments. It has been necessary to dye glass fibers by employing special dyeing techniques involving, for example, high temperatures, utilizing special dyes, and to employ along with the pigments polytetrafluoroethylene resins (Teflon), colloidal silicas, and like materials in order to form abrasive resistant finishes on the glass fiber surfaces.

It is an object of the present invention to provide a relatively simple and economical method of applying colorless or colored coatings to glass fiber fabrics, which method is applicable to both finished and unfinished fabrics, resulting in coatings which are wash- and light-fast and in fabrics which possess a desirable soft hand.

An additional object is to provide such a method which produces glass fiber fabrics of deep or other desired coloration, and this without requiring the utilization of relatively expensive Teflon treatment, heretofore commonly used.

It is a further object of this invention to provide coating compositions useful in such methods.

Other objects and advantages of the present invention will be apparent from the following detailed description thereof.

The coating composition, which may be applied to form a colorless coating on the glass fabrics or may be used as a vehicle for a pigment or pigments to produce a colored coating on glass fibers, is an aqueous dispersion containing, for every 100 parts, from about 5 to 30 parts of an aqueous emulsion of an ethyl acrylate-methyl methacrylate copolymer, from about 3 to 20 parts of polyethylene glycol di-2-ethylhexoate, from about 0.2 to 3 parts of di-butoxyethyl phthalate, from about 1 to 10 parts of a polyethylene glycol softener, and the balance essentially water. If desired, from about ½ to 2 parts of a penetrating agent may also be included in the vehicle. The preferred penetrating agent is an aqueous solution of a sulfonated aliphatic polyester (Anionyx R.W., manufactured by Onyx Oil and Chemical Co. of New Jersey), which solution contains from ½% to 2% by weight of the sulfonated aliphatic polyester.

In this composition the ethyl acrylate-methyl methacrylate copolymer is a resin binder which bonds to the fiber when the composition is applied, forming a colorless coating when the coating composition is applied without a pigment, and bonding the pigment to the fiber when a pigment or pigments are present. The polyethylene glycol di-2-ethylhexoate is a film-forming material which is exceptionally compatible with the aqueous acrylate-methacrylate emulsion and with the other constituents of the coating composition, and which imparts flexibility retaining properties to the coating notwithstanding wide variations in temperature, say from winter atmospheric temperatures to temperatures encountered when the fabrics are washed, say with boiling water. The di-butoxyethyl phthalate is a plasticizer which is compatible with the polyethylene glycol di-2-ethylhexoate and the other composition ingredients, imparts flexibility properties to the compositions within a wide range of temperatures and which, together with the aforesaid ethylhexoate, provides a tacky film which is readily adhered to the glass fibers. The polyethylene glycol softener cooperates with the acrylate-methacrylate copolymer, the ethylhexoate and the phthalate, to produce, when applied, coated fabrics having the desired soft hand. The four enumerated constituents in aqueous dispersion in the proportions indicated coact to provide a coating composition which has been found surprisingly efficacious for the treatment of glass fiber fabrics to impart thereto colorless or colored coatings which are wash- and light-fast and produce fabrics having a soft hand.

The penetrating agent, when used, improves the penetration of the coating composition into the glass fiber fabrics. The Anionyx R.W. has been found to be particularly effective and compatible with the other constituents of the coating composition. The coating composition may also contain a small amount from about 2 to about 5 parts of a combined softener and water repellent such as a zirconium synthetic wax complex known as Impregnole FH.

The above described coating composition, when used as a vehicle to produce colored surfaces or dyeings, is mixed with a pigment or color in the proportions of from 1 to 25 parts pigment suspension or dry pigment per 100 parts of the vehicle. Thus the present invention includes coating compositions containing from 80% to 100% of the aqueous dispersion having the composition described above and from 0% to 20% pigment.

In the treatment of finished glass fiber fabrics, the fabrics are padded through the coating composition, or the latter is otherwise applied to the fabric, and the coated fabric dried at 200° to 350° F. for 1 to 5 minutes.

In the treatment of unfinished or heat cleaned glass fiber fabrics from which the sucrose, gelatin or starchy sizing materials have been removed, as by a heat treatment at 650° or higher, the glass fiber fabrics are first padded with, or have otherwise applied thereto, an aqueous solution containing a Werner-type reactive chromium complex (e.g. Quillon). Such complexes include stearato chromic chloride and other complex compounds such as are described, for example, in United States Patent 2,273,040, granted February 17, 1942.

While it is preferred to employ stearato chromic chloride, other Werner-type chromium complexes disclosed in United States Patent 2,273,040 may be used. These chromium complexes can be made, for example, by reacting a basic chromium solution with the appropriate acid (stearic acid) following the general procedure disclosed in United States Patent 2,273,040.

The chromium complex is applied in an aqueous solution in a concentration ranging from about 1% to 5.0%, preferably at a concentration of about 2%, and upon curing forms a film bonded to the glass fiber fabric surfaces. The complex is firmly adhered to the glass fiber fabric surfaces by drying at a temperature of from about 200° to 350° F., and the fabric is then ready for the application of the previously described coating composition directly thereto, without requiring the utilization of the relatively expensive polytetrafluoroethylene treatment.

Another method of coating unfinished or heat cleaned glass fiber fabrics from which the sucrose, gelatin or starchy sizing materials have been removed, as by a heat treatment at 650° F. or higher, is to run the glass fiber fabrics through a pad bath containing the coating composition described previously with or without the color pigment, dry at a temperature of about 200° to 350° F. for 1 to 5 minutes, and then run through a pad bath containing:

1 to 5 parts chromium complex (Quillon), preferably 2 parts;
1 to 5 parts polyethylene glycol 400, preferably 2 parts; and the balance water, to a total of 100 parts, preferably 96 parts water.

In such pad bath, the concentration of the chromium complex and the polyethylene glycol should be about the same. The thus coated glass fiber fabrics are dried at 200° to 350° F. for 1 to 5 minutes, preferably 1½ minutes.

The ethyl acrylate-methyl methacrylate emulsion employed in the coating composition, which acts as a binder to bind the coating composition to the glass fiber surfaces, has a solids content of from about 45% to 50%. Suitable emulsions of this type include Acrylic Copolymer No. AC-33 manufatcured by the Rohm & Haas Company, and Acrylic Copolymer No. 2719 manufactered by the Borden Chemical Company.

The polyethylene glycol included in the coating compositions functions, as noted above, as a softener, and assists in imparting a soft hand to the glass fiber fabric treated. Any of the polyethylene glycols having molecular weights of between 190 and 630 may be so employed, preferably a polyethylene glycol having a molecular weight ranging from about 380 to 420 with an average weight of about 400. Lower molecular weight polyethylene glycols are too hygroscopic, while the glycols having molecular weights above about 630 cause a firming action in the fabric treated. The polyethylene glycol softeners having molecular weights in the above mentioned range impart the desirable smooth, soft hand to the fabric. The solution of the sulfonated aliphatic polyester, when used, helps the penetration into the glass fiber.

Any desired water-dispersible pigment or pigments may be added to the coating composition, with the latter serving as a vehicle for the pigment, in order to effect the production of a colored coating on glass fibers. Amongst the pigments which may be dispersed in accordance with this invention are the nitroso pigments such as Naphthol Green B (C.I. 10025); nitro pigments such as Naphthol Yellow S (C.I. 10316); Pigment Chlorine GG (C.I. 10330); Lithol Fast Yellow GG (C.I. 10325); azo pigments such as Toluidene red (C.I. 12130), para red (C.I. 12070), Graphthol Red 1115-2B (C.I. 15630) and Accosperse Naphthol Scarlet 22-7513 (C.I. 12315; Hansa yellows (e.g. C.I. 11660, 11670, 11680), permanent orange (C.I. 12060), benzidine yellows (C.I. 21095), Persian orange (C.I. 15510) and Lithol Red (C.I. 15630); pyrazolone pigments such as Hansa Yellow R (C.I. 12710); basic dye pigments such as Malachite Green (C.I. 42000), Crystal Violet (C.I. 42555) and Methyl Violet (C.I. 42535); auxanthine dye pigments; anthraquinone pigments; phthalocyanine pigments such as indigo (C.I. 73000), Ciba violets (e.g. C.I. 73610, 73615, 73620), and Monastral Blue (C.I. 74160); oxide pigments such as titanium oxides; carbon blacks and the like. Any of the above water-dispersible pigments may be employed, depending upon the particular coloration of the glass fibers desired.

It will be appreciated that the colorless or colored coating composition may be applied to glass fiber fabrics to be coated in any desired manner, for example, by padding, dipping, spraying, or the like. The amount applied will, of course, depend on the properties of the fabric treated, e.g., the thickness thereof. Moreover, the temperature of application is not critical; a preferred range is from about room temperature to 110° F.

After application of the coating composition, the glass fiber fabric is dried, as by passage through a curing oven maintained at a temperature of from about 200° to 350° F., preferably about 250° F. The residence time is adjusted to from 1 to 5 or more minutes, preferably about 1½ minutes, to facilitate firmly bonding the coating to the glass fiber surfaces. The optimum temperature and residence time can readily be determined by subjecting a sample of the fabric to be coated (with a colorless or colored coating) to heat for the time interval under consideration, and submitting the resulting sample to the standard wash- and light-fastness tests.

The following examples are given to illustrate the method and coating compositions of this invention. It will be understood that the invention is not confined to these illustrative embodiments.

EXAMPLE I

*Colorless coating an unfinished glass fiber fabric*

A coating composition was prepared by mixing the following ingredients:

24 parts arcylic emulsion of ethyl acrylate-methyl methacrylate (45% solids content)
14 parts polyethylene glycol di-2-ethylhexoate
2 parts di-butoxyethyl phthalate
56 parts water
4 parts polyethylene glycol (average molecular weight 400)

The size was removed from a glass fiber fabric by passing the fabric through an oven maintained at 650° F. or higher. Thereafter the heat cleaned fabric was run through a pad bath containing the above formulation. Thereafter the fabric was dried at 250° F. for 1½ minutes. Then the same fabric was run through a pad bath containing 2 parts stearato-chromic chloride (Quillon), 2 parts polyethylene glycol 400, and 96 parts water. This pad bath is hereinafter referred to as a Quillon-glycol mixture. The fabric was dried at 250° F. for 1½-minutes.

A white glass fiber fabric having a desirable soft hand and being substantially free from crocking was produced.

EXAMPLE II

*Coloring an unfinished glass fiber fabric*

A color composition was prepared by mixing the following ingredients:

12 parts acrylic emulsion of ethyl acrylate-methyl methacrylate (45% solids content)
7 parts polyethylene glycol di-2-ethylhexoate
1 part di-butoxyethyl phthalate
76 parts water
3 parts polyethylene glycol (average molecular weight 400)
8 parts phthalocyanine blue dispersed pigment
1.75 parts Anionyx R.W. solution (a solution consisting of 2 liquid ounces of Anionyx R.W. in one gallon water)

The size was removed from a glass fiber fabric by passing the fabric through an oven maintained at 650° F. or higher. Thereafter the heat cleaned fabric was run through a pad bath containing the above color formulation. Thereafter the fabric was dried at 250° F. for 1½ minutes. Then the colored fabric was run through a pad bath containing the Quillon-glycol mixture. The fabric was dried at 250° F. for 1½ minutes.

The resulting fabric was colored a deep blue, was substantially free from crocking and possessed a desirable soft hand.

EXAMPLE III

*Coloring a finished glass fiber fabric*

A color composition was prepared by mixing the following ingredients:

12 parts acrylic emulsion of ethyl acrylate-methyl methacrylate (45% solids content)
7 parts polyethylene glycol di-2-ethylhexoate
1 part di-butoxyethyl phthalate
76 parts water
3 parts polyethylene glycol (average molecular weight 400)
8 parts phthalocyanine blue dispersed pigment
1.75 parts Anionyx R.W. solution
3.50 parts Impregnole solution (a solution consisting of 4 parts of zirconium synthetic wax complex type, called Impregnole FH, mixed in 96 parts water)

The finished glass fiber fabric was passed through a pad bath containing the above color formulation; thereafter the fabric was dried at 250° for 2 minutes. The resulting fabric was colored a deep blue, was substantially free from crocking and possessed a desirable soft hand.

EXAMPLE IV

*Coloring an unfinished glass fiber fabric by a different procedure from that of Example II*

The size was removed from a glass fiber fabric by passing the fabric through an oven maintained at 650° F. Thereafter the heat cleaned fabric was first run through a pad bath containing a 2% Quillon solution in water; thereafter the fabric was dried at 250° F. for 1½ minutes. Then the fabric was run through a pad bath containing the color composition as in Example II. The colored fabric was dried at 250° F. for 1½ minutes.

The resulting fabric was colored a deep blue, was substantially free from crocking and possessed a desirable soft hand.

It will be understood that various changes may be made in the method and composition of the invention without departing from the scope thereof. Accordingly, the invention is not to be limited except as defined by the appended claims.

What is claimed is:

1. A method of coating glass fiber fabrics, which method comprises treating said fabrics with an aqueous dispersion containing, per 100 parts by weight, from 5 to 30 parts by weight of an aqueous emulsion of an ethyl acrylate-methyl methacrylate copolymer, from 3 to 20 parts by weight of polyethylene glycol di-2-ethylhexoate, from 0.2 to 3 parts by weight of di-butoxyethyl phthalate, from 1 to 10 parts by weight of a polyethylene glycol softener, the balance essentially water, and drying the fabrics to bond the coating thereon.

2. The method as defined in claim 1, in which the aqueous dispersion also contains from ½ to 2 parts by weight of a solution containing a penetrating agent.

3. A method of applying a coating to an unfinished textile fabric containing glass fibers, comprising the steps of treating said fabric with an aqueous solution of a Werner-type reactive chromium complex, drying the thus treated fabric, subsequently applying to the fabric a coating composition comprising from 0% to 20% of a water-dispersible pigment and from 80% to 100% of an aqueous dispersion, said dispersion containing, per 100 parts by weight, from 5 to 30 parts by weight of an aqueous emulsion of an ethyl acrylate-methyl methacrylate copolymer, from 3 to 20 parts by weight of polyethylene glycol di-2-ethylhexoate, from 0.2 to 3 parts by weight of dibutoxyethyl phthalate, from 1 to 10 parts by weight of a polyethylene glycol softener, the balance essentially water, and drying the fabric to bond the coating composition thereto.

4. A method of applying a coating to a finished textile fabric of glass fibers comprising the steps of treating said fabric with a coating composition comprising from 0% to 20% of a water-dispersible pigment and from 80% to 100% of an aqueous dispersion, said dispersion containing, per 100 parts by weight, from 5 to 30 parts by weight of an aqueous emulsion of an ethyl acrylate-methyl methacrylate copolymer, from 3 to 20 parts by weight of polyethylene glycol di-2-ethylhexoate, from 0.2 to 3 parts by weight of di-butoxyethyl phthalate, from 1 to 10 parts by weight of a polyethylene glycol softener, from ½ to 2 parts of a solution containing a penetrating agent, and from 2 to 5 parts combined softener and water repellent, the balance being essentially water, and drying the fabric to bond the coating composition thereto.

5. A method of applying a coating to glass fiber fabrics comprising the steps of treating said fabrics with a coating composition containing from 0% to 20% of a water-dispersible pigment and from 80% to 100% of an aqueous dispersion containing, per 100 parts by weight, from 5 to 30 parts by weight of an aqueous emulsion of an ethyl acrylate-methyl methacrylate copolymer having a solids content of from 45% to 50%, from 3 to 20 parts by weight of polyethylene glycol di-2-ethylhexoate, from 0.2 to 3 parts by weight of di-butoxyethyl phthalate, from 1 to 10 parts of a polyethylene glycol softener having a molecular weight of from 190 to 630, and from ½ to 2 parts of a solution of a sulfonated, aliphatic polyester, the balance being essentially water, and heating the treated fabrics to a temperature of from 200° to 350° F. for a period of from 1 to 5 minutes to firmly bond the coating composition to the glass fiber fabrics.

6. A method of applying a coating to an unfinished textile material containing glass fibers, comprising treating said material with an aqueous dispersion consisting of, per 100 parts by weight, from 5 to 30 parts of an aqueous emulsion of an ethyl acrylate-methyl methacrylate copolymer, from 3 to 20 parts of polyethylene glycol di-2-ethylhexoate, from 0.2 to 3 parts of di-butoxyethyl phthalate, from 1 to 10 parts of a polyethylene glycol softener, from ½ to 2 parts of a sulfonated, aliphatic polyester, and the balance essentially water, drying the material to bond the coating composition thereto, thence treating said coated material with an aqueous solution containing a mixture of a Werner-type reactive chromium complex, and polyethylene glycol, and drying same.

7. A method of applying a coating to an unfinished textile material containing glass fibers, comprising treating said materials with a color coating composition containing from 1 to 25 parts of a water-dispersible pigment and from 75 to 99 parts of an aqueous dispersion consisting of, per 100 parts by weight of dispersion, from 5 to 30 parts of an aqueous emulsion of an ethyl acrylate-methyl methacrylate copolymer, from 3 to 20 parts of polyethylene glycol di-2-ethylhexoate, from 0.2 to 3 parts of di-butoxyethyl phthalate, from 1 to 10 parts of a polyethylene glycol softener, and ½ to 2 parts of a solution of a sulfonated, aliphatic polyester, the balance being essentially water, drying the material to bond the coating composition thereto, thence treating said coated material with an aqueous solution containing a mixture of a Werner-type reactive chromium complex and polyethylene glycol, and drying same.

8. A composition for coating glass fabrics comprising an aqueous dispersion containing, per 100 parts by weight, from 5 to 30 parts by weight of an aqueous emulsion of an ethyl acrylate-methyl methacrylate copolymer, from 3 to 20 parts by weight of polyethylene glycol di-2-ethylhexoate, from 0.2 to 3 parts by weight of di-butoxyethyl phthalate, from 1 to 10 parts by weight of a polyethylene glycol softener, the balance of said dispersion consisting essentially of water.

9. A composition as defined in claim 8 also containing from ½ to 2 parts of a solution containing a penetrating agent.

10. A coating composition for application to glass fiber surfaces comprising from 0% to 20% of a water-dispersible pigment and from 80% to 100% of an aqueous dispersion, said dispersion containing, per 100 parts by weight, from 5 to 30 parts by weight of an aqueous emulsion of an ethyl acrylate-methyl methacrylate copolymer, from 3 to 20 parts by weight of polyethylene glycol di-2-ethylhexoate, from 0.2 to 3 parts by weight of di-butoxyethyl phthalate, from 1 to 10 parts by weight of a polyethylene glycol softener, and the balance essentially water.

11. A coating composition for application to glass fiber surfaces comprising from 0% to 20% of a water-dispersible pigment and from 80% to 100% of an aqueous dispersion, said dispersion containing, per 100 parts by weight, from 5 to 30 parts by weight of an aqueous emulsion having from 45% to 50% solids content of an ethyl acrylate-methyl methacrylate copolymer, from 3 to 20 parts by weight of polyethylene glycol di-2-ethylhexoate, from 0.2 to 3 parts by weight of di-butoxyethyl phthalate, from 1 to 10 parts by weight of a polyethylene glycol softener having a molecular weight in the range of from 190 to 630, from ½ to 2 parts of a solution of a sulfonated, aliphatic polyester, and the balance essentially water.

References Cited by the Examiner
UNITED STATES PATENTS

| | | | |
|---|---|---|---|
| 2,795,564 | 6/57 | Conn et al. | 260—29.6 |
| 2,799,598 | 7/57 | Bielfeld et al. | 117—126 |
| 2,868,752 | 1/59 | Frazier et al. | 260—29.6 |
| 2,994,619 | 8/61 | Eilerman | 117—126 |

MURRAY TILLMAN, *Primary Examiner.*

LEON J. BERCOVITZ, *Examiner.*